US009891615B2

United States Patent
Shirose et al.

(10) Patent No.: US 9,891,615 B2
(45) Date of Patent: Feb. 13, 2018

(54) NUMERICAL CONTROLLER WITH FUNCTION OF AUTOMATICALLY RECONSTRUCTING SETTINGS AND FUNCTION OF PREVENTING INCORRECT SETTINGS

(71) Applicant: FANUC Corporation, Minamitsuru-gun, Yamanashi (JP)

(72) Inventors: Tatsuya Shirose, Minamitsuru-gun (JP); Mamoru Kubo, Minamitsuru-gun (JP); Koichi Murata, Minamitsuru-gun (JP)

(73) Assignee: FANUC Corporation, Minamitsuru-gun, Yamanashi (JP)

( * ) Notice: Subject to any disclaimer, the term of this patent is extended or adjusted under 35 U.S.C. 154(b) by 343 days.

(21) Appl. No.: 14/790,287

(22) Filed: Jul. 2, 2015

(65) Prior Publication Data

US 2016/0011582 A1 Jan. 14, 2016

(30) Foreign Application Priority Data

Jul. 14, 2014 (JP) ................................. 2014-144112

(51) Int. Cl.
 *G05B 9/02* (2006.01)
 *G05B 19/406* (2006.01)

(52) U.S. Cl.
 CPC .. *G05B 19/406* (2013.01); *G05B 2219/35283* (2013.01); *G05B 2219/36535* (2013.01)

(58) Field of Classification Search
 CPC .................. G06B 2219/34427; G05B 19/4063
 USPC ........................................................ 700/79
 See application file for complete search history.

(56) References Cited

U.S. PATENT DOCUMENTS

| 5,293,024 A | 3/1994 | Sugahara et al. |
| 6,477,441 B1 | 11/2002 | Sagasaki |
| 2002/0049512 A1* | 4/2002 | Mizuno ............ G05B 19/41845 700/169 |

(Continued)

FOREIGN PATENT DOCUMENTS

| JP | H02-56642 A | 2/1990 |
| JP | H03-182907 A | 8/1991 |

(Continued)

OTHER PUBLICATIONS

Notification of Reasons for Refusal dated Dec. 27, 2016 in Japanese Patent Application No. 2014-144112 (4 pages) with an English translation (3 pages).

*Primary Examiner* — Robert Cassity
(74) *Attorney, Agent, or Firm* — Drinker Biddle & Reath LLP

(57) ABSTRACT

A numerical controller includes a storage area for storing startable start-up settings and a database for storing start-up setting values that inhibit the completion of a start-up. If a start-up has been completed at the time of start-up, current start-up settings are stored in the storage area as startable settings. If the start-up has not been completed, start-up setting values that inhibit the completion are registered in the database, the current settings are reconstructed to startable settings, and the numerical controller is restarted. After start-up settings are changed, the database is searched. If the same start-up settings as the changed start-up setting are found, the found start-up settings are outputted.

14 Claims, 14 Drawing Sheets

(56) References Cited

U.S. PATENT DOCUMENTS

| | | | | |
|---|---|---|---|---|
| 2006/0150012 A1* | 7/2006 | Hosokawa | ......... | G05B 19/4067 |
| | | | | 714/14 |
| 2014/0121789 A1* | 5/2014 | Brandes | ............... | G05B 23/027 |
| | | | | 700/80 |
| 2015/0277402 A1* | 10/2015 | Heine | .................... | G05B 15/02 |
| | | | | 700/87 |
| 2016/0291576 A1* | 10/2016 | Nakamura | ......... | G05B 19/4063 |

FOREIGN PATENT DOCUMENTS

| | | |
|---|---|---|
| JP | H03-288208 A | 12/1991 |
| JP | H05-158520 A | 6/1993 |
| JP | H05-341967 A | 12/1993 |
| JP | H07-051986 A | 2/1995 |
| JP | 2001-187627 A | 7/2001 |
| JP | 2007-018235 A | 1/2007 |
| JP | 2010-015316 A | 1/2010 |
| JP | 2011-118817 A | 6/2011 |
| JP | 2013-140536 A | 7/2013 |
| WO | WO-98/37466 A1 | 8/1998 |

\* cited by examiner

PRIOR ART

NUMERICAL CONTROLLER WITH FUNCTION OF AUTOMATICALLY RECONSTRUCTING SETTINGS AND FUNCTION OF PREVENTING INCORRECT SETTINGS

RELATED APPLICATION DATA

This application claims priority under 35 U.S.C. § 119 and/or § 365 to Japanese Application No. 2014-144112 filed Jul. 14, 2014, the entire contents is incorporated herein by reference.

BACKGROUND OF THE INVENTION

1. Field of the Invention

The present invention relates to a numerical controller, and particularly to a numerical controller capable of easily identifying a change of an operating environment which inhibits a start-up of the controller.

2. Description of the Related Art

In a numerical controller, in the case where a start-up of the numerical controller is inhibited by settings relating to start-up which have been incorrectly changed, settings backed up when the numerical controller has been started can be manually loaded into the numerical controller to start the numerical controller. However, in that case, the backed-up settings have setting values at the time of backing up, and latest setting values are not reflected therein. Accordingly, some of settings need to be set again after the backed-up settings have been loaded, and there is a problem that it takes a long time.

To solve such the above-described problem, a technique for backing up settings in which latest setting values are reflected has been proposed in, for example, Japanese Patent Application Laid-Open No. 03-288208. In this technique, settings are automatically backed up to a storage unit during events such as the turning on of the numerical controller.

However, in the above-described technique, settings in which latest setting values are reflected are backed up by backing up settings automatically to the storage unit during events such as the turning on of the numerical controller, but settings are unconditionally backed up even in the case where there are incorrect settings. Accordingly, in the case where incorrect settings have been stored in the storage unit, there is a problem that some of settings need to be set again after the backed-up settings have been loaded, as in the prior-art technique.

Hereinafter, one example of a prior-art numerical controller will be described with reference to FIG. 14.

A numerical controller 100 includes a CPU 110 as a processor which performs arithmetic processing, and an input device controller 120 for controlling an external input device 500, a storage unit controller 130 for controlling a storage unit 200 which stores a backup of start-up settings of the numerical controller 100, a memory 140 such as a RAM or a ROM, a non-volatile memory 150 including an SRAM or the like and storing data such as settings relating to the start-up of the numerical controller 100, a display controller 160 for controlling a display unit 300, a power supply controller 170 for controlling the turning on and off of the numerical controller 100 based on an ON/OFF signal from a power switch 600, and a signal interface 180 for controlling the sending or receiving of a signal to or from a machine tool 400, which are connected to the CPU 110 through a bus 190.

When the numerical controller 100 of FIG. 14 is powered on by operating the power switch 600, setting values of settings currently set in the numerical controller 100 are automatically backed up to a setting value memory area of the storage unit 200.

Moreover, a technique for automatically restoring a controller which cannot be started has been proposed in, for example, Japanese Patent Application Laid-Open No. 05-341967. In this technique, when an operating environment of a computer is changed and the computer is restarted, the operating environment before changing is backed up; and, in the case where the computer cannot be started, the operating environment before changing is automatically reconstructed.

However, in the above-described technique, when changing the operating environment of the computer and restarting the computer, the controller which cannot be started is automatically restored using the operating environment backed up before changing. However, there is a problem that it is difficult to identify a change in the operating environment which inhibits a start-up only by automatically carrying out a restoration process.

Further, a technique for managing settings has been proposed in, for example, Japanese Patent Application Laid-Open No. 2011-118817. In this technique, differences between default settings and settings changed by an operator are managed using a list.

However, the above-described technique can detect differences in settings, but cannot determine whether changed settings are correct or not and prevent changes to incorrect settings.

SUMMARY OF THE INVENTION

Accordingly, an object of the present invention is to provide a numerical controller capable of easily identifying a change in an operating environment which inhibits a start-up of the controller in the case where a change of a setting relating to start-up inhibits the completion of a start-up of the controller.

A numerical controller according to the present invention includes: a processor which controls a start-up based on a start-up setting for setting an operating environment, the numerical controller comprising; an incorrect-setting detection database for storing a setting value of a start-up setting that inhibits completion of a start-up of the numerical controller; a startable setting storage unit for storing a start-up setting which allows the numerical controller to be started; a start-up determination unit for determining whether a start-up of the numerical controller has been completed at a time of start-up of the numerical controller; a back-up unit for storing a current start-up setting in the startable setting storage unit as startable setting data if the start-up determination unit determines that the start-up has been completed; an incorrect setting registration unit for detecting, if the start-up determination unit has determined that the start-up has not been completed, a start-up setting that inhibits completion of a start-up and registering the detected start-up setting in the incorrect-setting detection database; a start-up setting reconstruction unit for reconstructing a current setting of the numerical controller to a startable setting based on the startable setting data stored in the startable setting storage unit; a restart unit for restarting the numerical controller; and an incorrect setting search unit for, when the start-up setting of the numerical controller has been changed, searching the incorrect-setting detection database based on the changed start-up setting, and, if the same start-up setting as the changed start-up setting is found, outputting the found start-up setting.

Each of the start-up determination unit, the back-up unit, the incorrect setting registration unit, the start-up setting reconstruction unit, and the restart unit may be configured to function on a processor different from the processor which controls a start-up of the numerical controller.

The start-up determination unit may determine that a start-up has been completed if one machining cycle has been completed within a certain length of time.

The start-up determination unit may determine that a start-up has been completed if a specific signal has been inputted within a certain length of time.

The start-up determination unit may determine that a start-up has been completed if a command has been received from an application incorporated in the numerical controller within a certain length of time.

The start-up determination unit may determine that a start-up has been completed if a servo motor becomes ready within a certain length of time.

The start-up determination unit may determine that a start-up has been completed if a spindle motor becomes ready within a certain length of time.

The start-up determination unit may determine that a start-up has been completed if a network communication becomes ready within a certain length of time.

In the present invention, in the case where a change of a setting relating to start-up inhibits the completion of a start-up of the controller, an incorrect setting is detected from current settings to be registered in the incorrect-setting detection database, the current settings are reconstructed to startable settings, and the numerical controller is restarted. After the restart, the registered incorrect setting is presented to an operator so that a change of an operating environment which inhibits a start-up of the controller can be easily identified.

Moreover, referring to the incorrect-setting detection database when settings relating to start-up are changed, it is possible to detect an incorrect setting which inhibits a start-up, thereby enabling an issuance of a warning to an operator.

BRIEF DESCRIPTION OF THE DRAWINGS

The forgoing and other objects and feature of the invention will be apparent from the following description of preferred embodiments of the invention with reference to the accompanying drawings, in which.

DETAILED DESCRIPTION OF THE PREFERRED EMBODIMENTS

Figure 1:
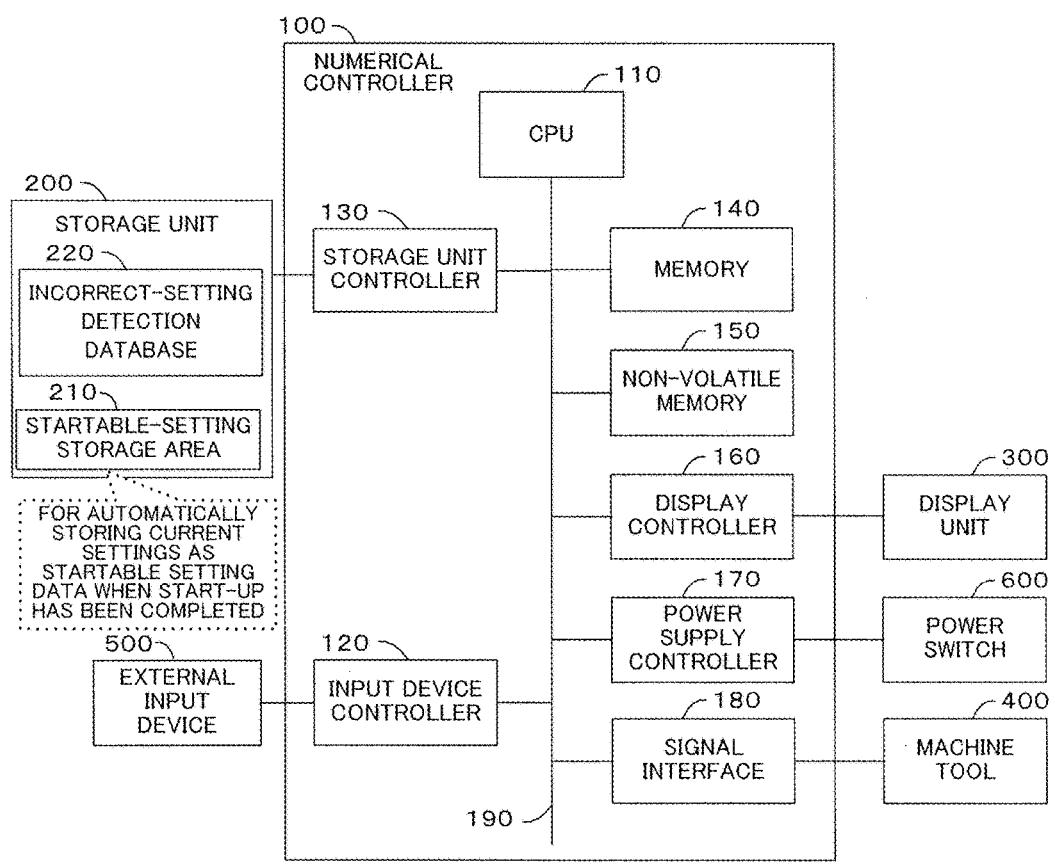
FIG. 1 is a block diagram showing a principal part of a first embodiment of a numerical controller according to the present invention.

Hereinafter, embodiments of the present invention will be described with reference to drawings. It should be noted that components identical or similar to those in the prior-art technique will be explained using the same reference numerals.

First, a first embodiment of a numerical controller according to the present invention will be described with reference to FIG. 1.

A numerical controller 100 includes a CPU 110 as a processor which performs arithmetic processing, and an input device controller 120 for controlling an external input device 500, a storage unit controller 130 for controlling a storage unit 200, a memory 140 such as a RAM or a ROM, a non-volatile memory 150 including an SRAM or the like and storing data such as settings relating to the start-up of the numerical controller 100, a display controller 160 for controlling a display unit 300, a power supply controller 170 for controlling the turning on and off of the numerical controller 100 based on an ON/OFF signal from a power switch 600, and a signal interface 180 for controlling the sending or receiving of a signal to or from a machine tool 400, which are connected to the CPU 110 through a bus 190.

The storage unit 200 includes a startable-setting storage area 210 and an incorrect-setting detection database 220. The startable-setting storage area 210 stores the backed-up settings relating to the start-up of the numerical controller 100 at the time of completion of the start-up of the numerical controller 100 when the numerical controller 100 is started. In other words, the startable-setting storage area 210 always stores settings which allows the numerical controller 100 to be started. Meanwhile, the incorrect-setting detection database 220 is a database for accumulating and managing settings relating to the start-up of the numerical controller 100 for cases where the start-up of the numerical controller 100 has failed when the numerical controller 100 is started.

The operation of the numerical controller 100 of FIG. 1 at the time of start-up will be described with reference to FIGS. 2 to 5.

Figure 2:
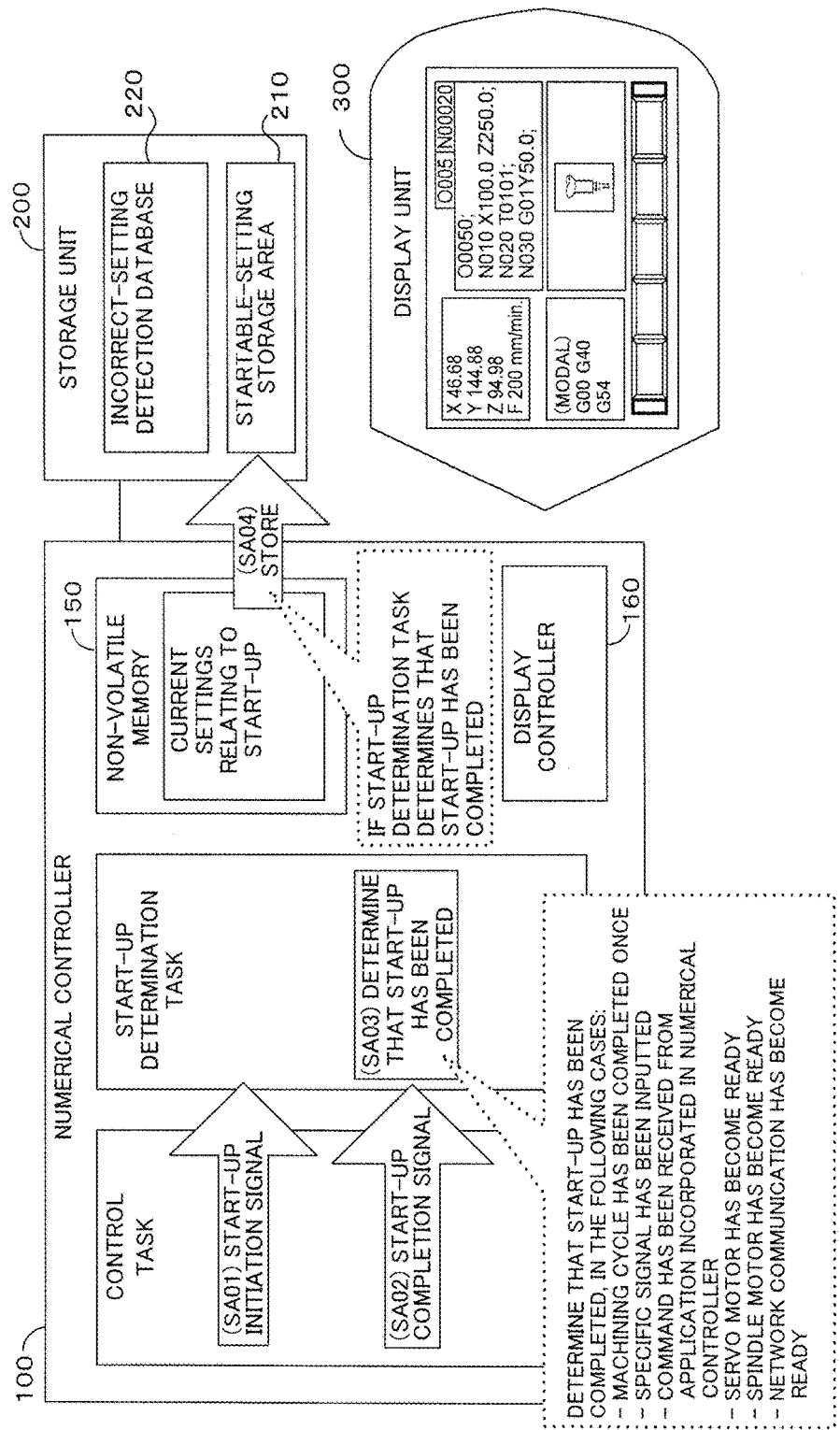
FIG. 2 is a diagram showing the outline of the operation of the numerical controller of FIG. 1 for the case where a start-up has been successfully completed.

FIG. 2 shows the outline of the operation of the numerical controller 100 of the present embodiment for the case where the numerical controller 100 has been successfully started.

As shown in FIG. 2, as tasks for controlling the start-up of the numerical controller 100, a control task and a task (hereinafter referred to as a start-up determination task) which includes a start-up determination process are running on the numerical controller 100 of the present embodiment. In the case where the numerical controller 100 has been successfully started, each of the tasks runs in accordance with the following procedure.

[SA01] When a start-up of the numerical controller 100 is initiated by, for example, an operator operating the power supply controller 170, the control task sends a start-up initiation signal indicating the initiation of a start-up process to the start-up determination task.

[SA02] When the process for starting the numerical controller 100 is completed, the control task sends a start-up completion signal indicating the completion of the start-up process to the start-up determination task.

[SA03] If the start-up determination task receives the start-up completion signal from the control task within a certain length of time after receiving the start-up initiation signal, the start-up determination task determines that the start-up of the numerical controller 100 has been completed. It should be noted that a determination as to whether a start-up has been completed or not may be made using any criterion as long as a determination as to whether the numerical controller 100 becomes available or not can be made using the criterion. Such criteria include a condition in which a machining cycle of the machine tool 400 has been completed once, a condition in which a specific signal such as a start-up completion signal has been inputted from the machine tool 400 or the like through a programmable machine controller (PMC) or the like, a condition in which a command has been received from an application incorporated in the numerical controller 100, a condition in which it has been detected that a servo motor or a spindle motor has satisfied a start-up condition and become excited, and a condition in which a connection for network communication has been established to be ready for sending and receiving data.

[SA04] The start-up determination task backs up settings relating to start-up which are currently set in the numerical controller 100, as startable setting data, to the startable-setting storage area 210 of the storage unit 200.

The numerical controller 100 can always back up startable setting data which reflects latest setting values, by the above-described operation.

Figure 3:
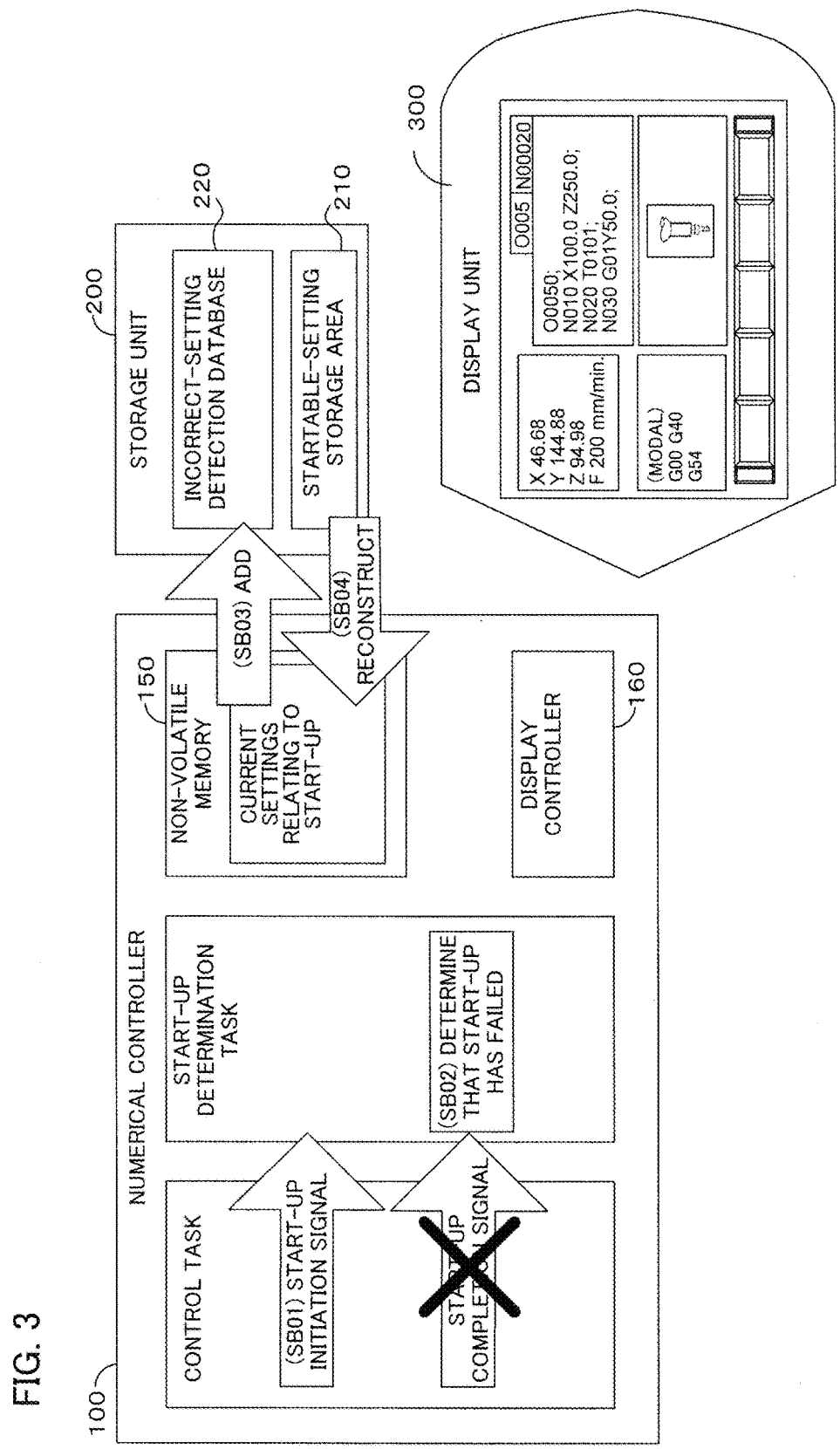
FIG. 3 is a diagram showing the outline of the operation of the numerical controller of FIG. 1 for the case where a start-up has failed.

FIG. 3 shows the outline of the operation of the numerical controller 100 of the present embodiment for the case where the start-up of the numerical controller 100 has failed. If the start-up of the numerical controller 100 has failed, each task runs in accordance with the following procedure.

[SB01] When a start-up of the numerical controller 100 is initiated by, for example, an operator operating the power supply controller 170, the control task sends a start-up initiation signal indicating the initiation of a start-up process to the start-up determination task.

[SB02] If the start-up determination task cannot receive a start-up completion signal within a certain length of time after receiving the start-up initiation signal from the control task, the start-up determination task determines that the start-up of the numerical controller 100 has failed.

[SB03] The start-up determination task detects settings causing a start-up failure from the current settings relating to start-up by a processing procedure described later, and adds the detected settings to the incorrect-setting detection database 220.

[SB04] The start-up determination task acquires startable setting data of the numerical controller 100 from the startable-setting storage area 210 of the storage unit 200, and reconstructs settings relating to start-up which are set in the non-volatile memory 150.

[SB05] The start-up determination task restarts the numerical controller 100.

Figure 4:
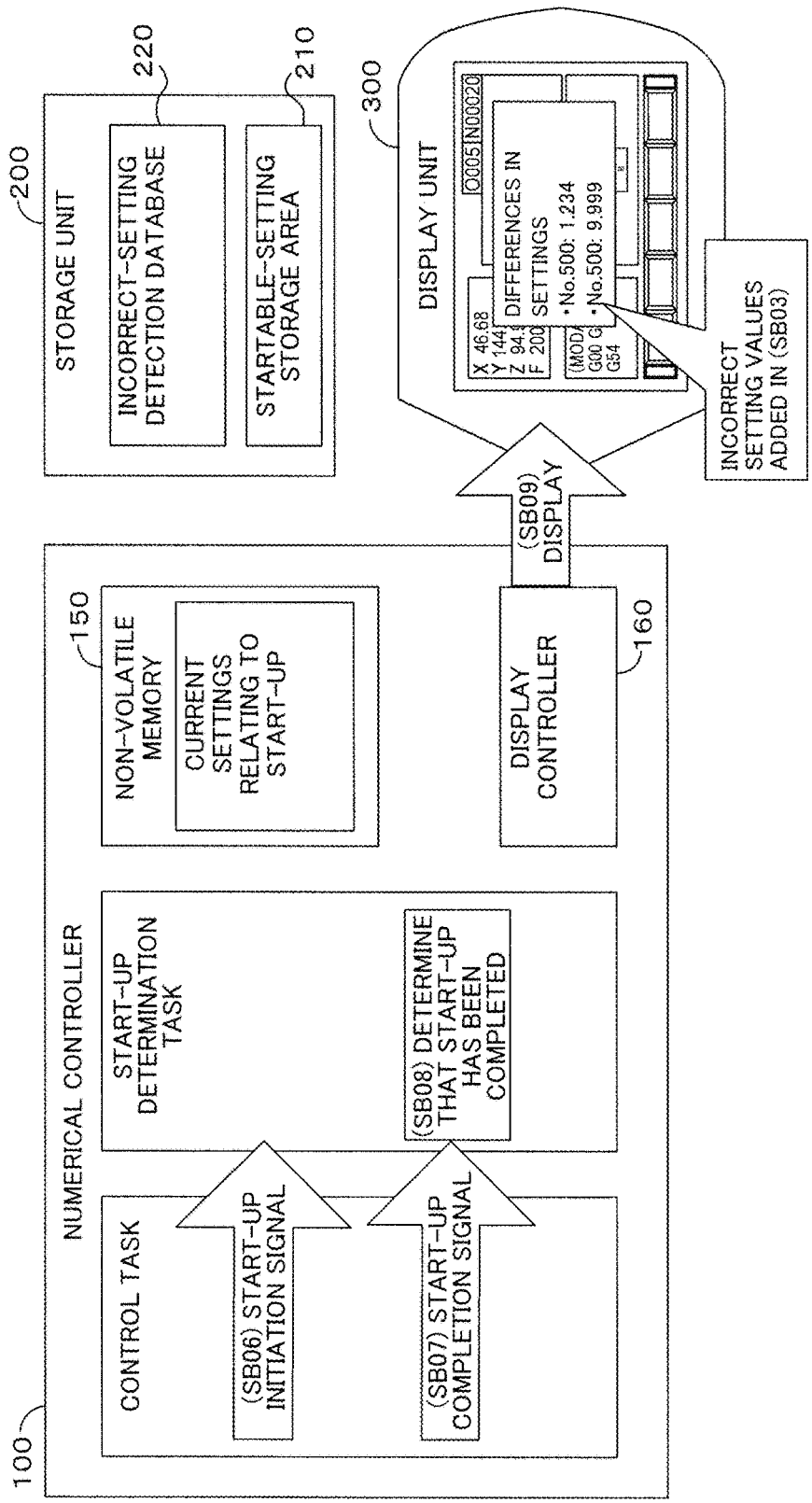
FIG. 4 is a diagram showing the outline of the operation of the numerical controller of FIG. 1 at the time of a restart.

FIG. 4 shows the outline of the operation of the numerical controller 100 restarted by the procedure shown in FIG. 3. Each task runs in accordance with the following procedure at the time of a first restart after the start-up of the numerical controller 100 has failed.

[SB06] At the time of a restart of the numerical controller 100, the control task sends a start-up initiation signal indicating the initiation of a start-up process to the start-up determination task.

[SB07] When the process for starting the numerical controller 100 has been completed, the control task sends a start-up completion signal indicating the completion of the start-up process to the start-up determination task.

[SB08] If the start-up determination task receives a start-up completion signal within a certain length of time after receiving the start-up initiation signal from the control task, the start-up determination task determines that the start-up of the numerical controller 100 has been completed.

[SB09] The control task displays differences in settings relating to start-up detected in SB03 on the display unit 300 connected to the numerical controller 100.

Figure 5:
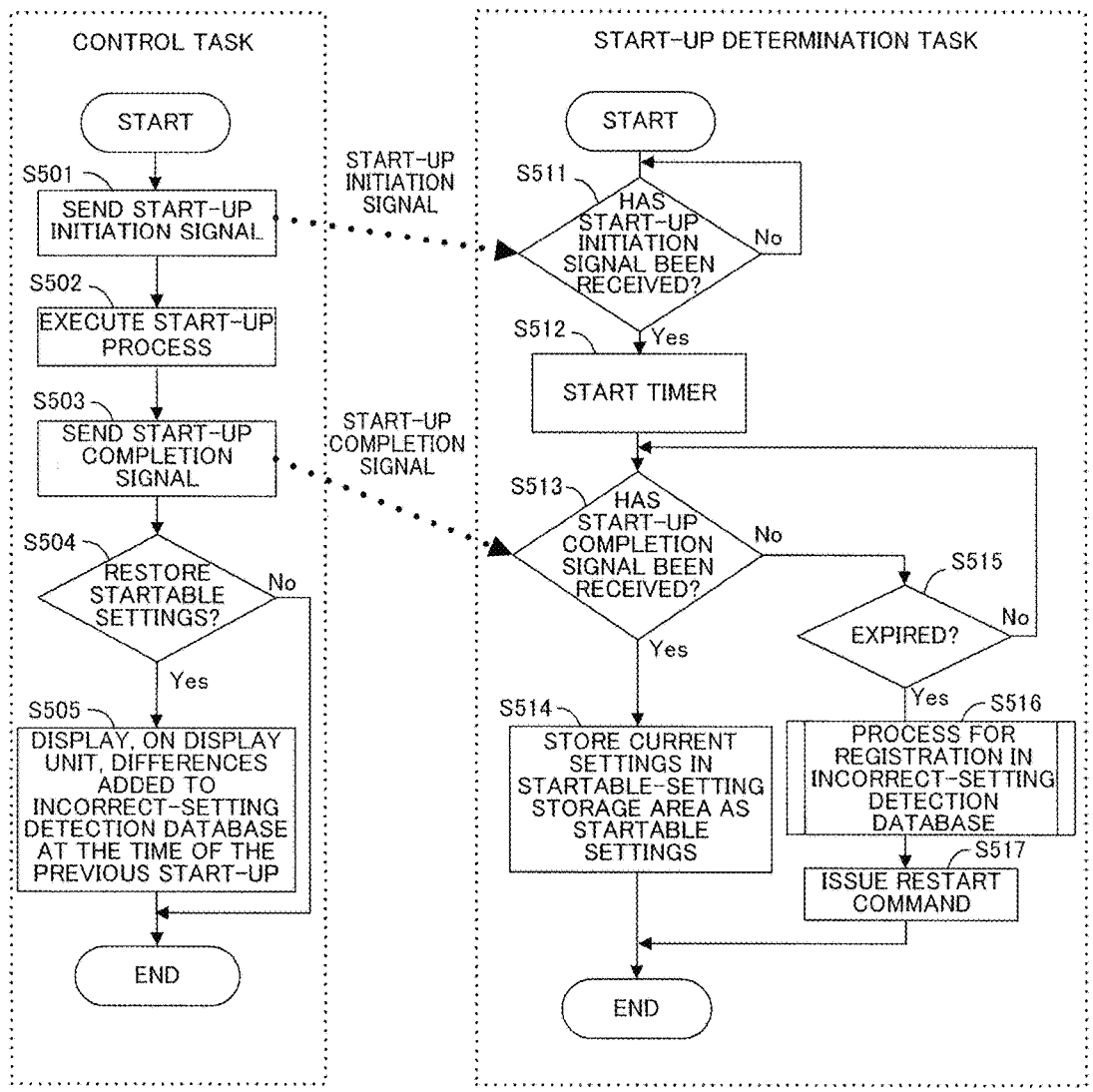
FIG. 5 is a flowchart showing a process performed by the numerical controller of FIG. 1 at the time of a start-up.

Hereinafter, the process for starting the numerical controller 100 explained with reference to FIGS. 2 to 4 will be described in detail using a flowchart, of FIG. 5.

<Processing Flow of Control Task>

[Step S501] When a start-up of the numerical controller 100 is initiated by, for example, an operator operating the power supply controller 170, the control task sends a start-up initiation signal indicating the initiation of a start-up process to the start-up determination task.

[Step S502] The control task reads the current settings relating to start-up stored in the non-volatile memory 150, and executes a process for starting the numerical controller 100.

[Step S503] If the start-up of the numerical controller 100 is completed by the process in step S502, the control task sends a start-up completion signal indicating the completion of the start-up process to the start-up determination task.

[Step S504] The control task determines whether the current start-up is a restart based on incorrect settings or not. This determination process may be realized by, for example, providing a flag or the like indicating a restart in the non-volatile memory 150. Then, if the current start-up is a restart based on incorrect settings (Yes), the flow proceeds to step S505. If the current start-up is a normal start-up (No), the processing by the control task is ended.

[Step S505] The control task reads data added to the incorrect-setting detection database 220 at the time of the previous start-up from the incorrect-setting detection database 220, and displays the data on the display unit 300 connected to the numerical controller 100 such that differences between incorrect settings and correct settings can be seen.

<Processing Flow of Start-Up Determination Task>

[Step S511] The start-up determination task waits until receiving a start-up initiation signal from the control task. When the start-up determination task receives a start-up initiation signal from the control task, the flow proceeds to step S512.

[Step S512] The start-up determination task starts a timer for counting start-up completion waiting time.

[Step S513] The start-up determination task determines whether a start-up completion signal is received or not. If a start-up completion signal has been received (Yes), the flow proceeds to step S514. If a start-up completion signal has not been received (No), the flow proceeds to step S515.

[Step S514] When the start-up determination task receives a start-up completion signal, the start-up determination task stores settings currently set in the non-volatile memory 150 in the startable-setting storage area 210 of the storage unit 200 as startable setting data.

[Step S515] The start-up determination task reads the value of the timer, and determines whether the start-up completion waiting time has been expired or not. If the start-up completion waiting time has not been expired (No), the flow proceeds to step S513. If the start-up completion waiting time has been expired (Yes), the flow proceeds to step S516.

[Step S516] The start-up determination task detects a group of parameters causing a start-up failure in the start-up process by a processing procedure described later, adds the value of an incorrectly-set parameter among the detected group of parameters to the incorrect-setting detection database 220, and reconstructs the current settings based on the startable setting data stored in the startable-setting storage area 210 of the storage unit 200 such that the current settings become startable settings.

[Step S517] The start-up determination task restarts the numerical controller 100 based on the settings reconstructed in step S516.

Since the numerical controller 100 of the present embodiment operates as described above, the numerical controller 100 can be automatically restarted even in the case where settings relating to start-up have been changed to incorrect settings. Accordingly, maintainability in an emergency is enhanced.

Moreover, even in the case where incorrect settings are made, displaying points which have been changed immediately before a start-up failure helps an operator to identify a cause of the start-up failure. Thus, the time required for reconfiguration can be reduced.

Figure 6:
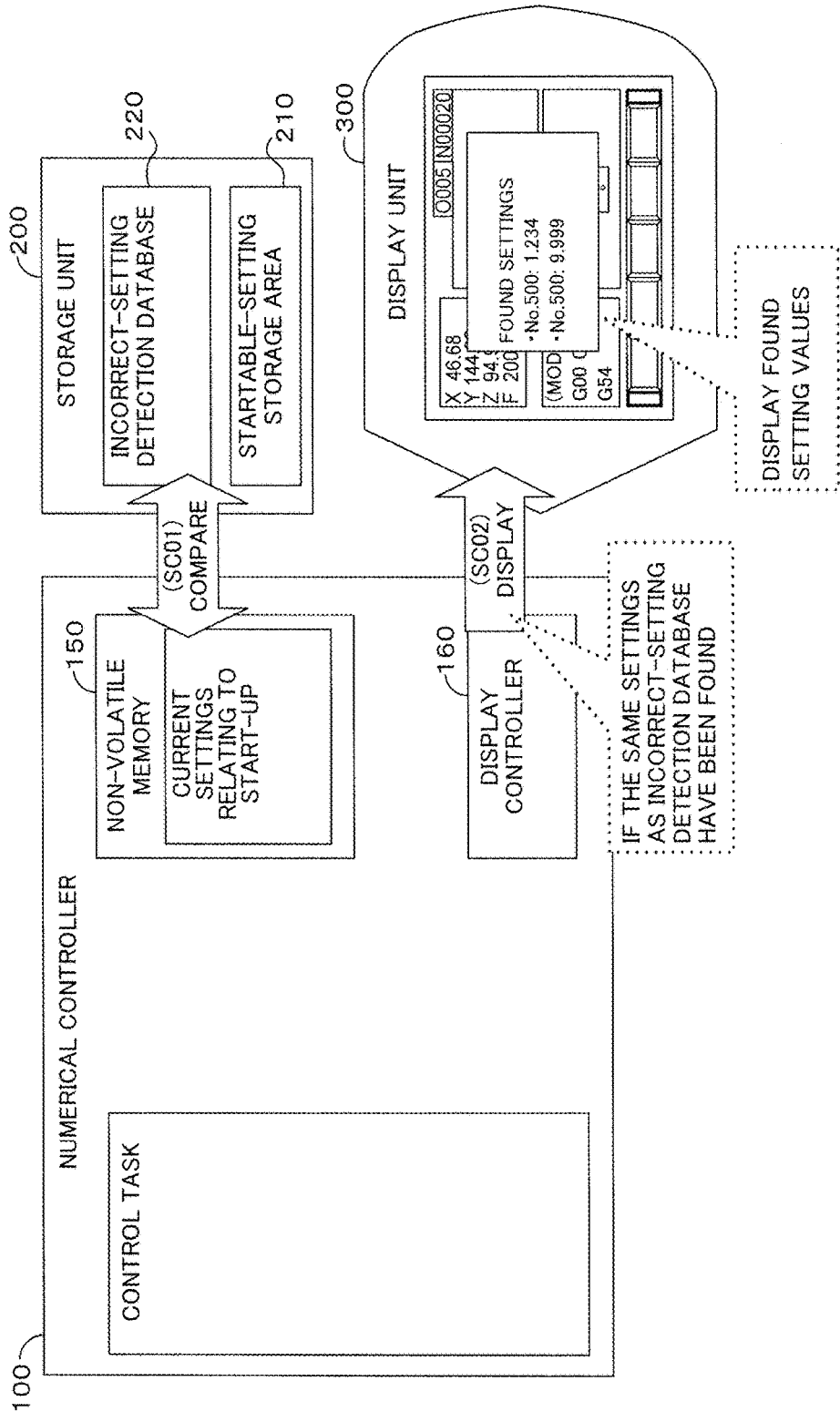
FIG. 6 is a diagram showing the outline of an operation for detecting incorrect settings when an operator has changed settings on the numerical controller of FIG. 1.

FIG. 6 shows the outline of an operation for detecting incorrect settings when an operator changes settings on the numerical controller 100. In the case where the numerical controller 100 detects a malfunction, each task runs in accordance with the following procedure.

[SC01] In the case where an operator has changed settings of the numerical controller 100, the control task searches the incorrect-setting detection database 220 based on settings changed by the operator by a processing procedure described later.

[SC02] In the case where the same settings as in the incorrect-setting detection database 220 are found in SC01, the control task displays the found settings on a screen of the display unit 300 connected to the numerical controller 100.

Figure 7:
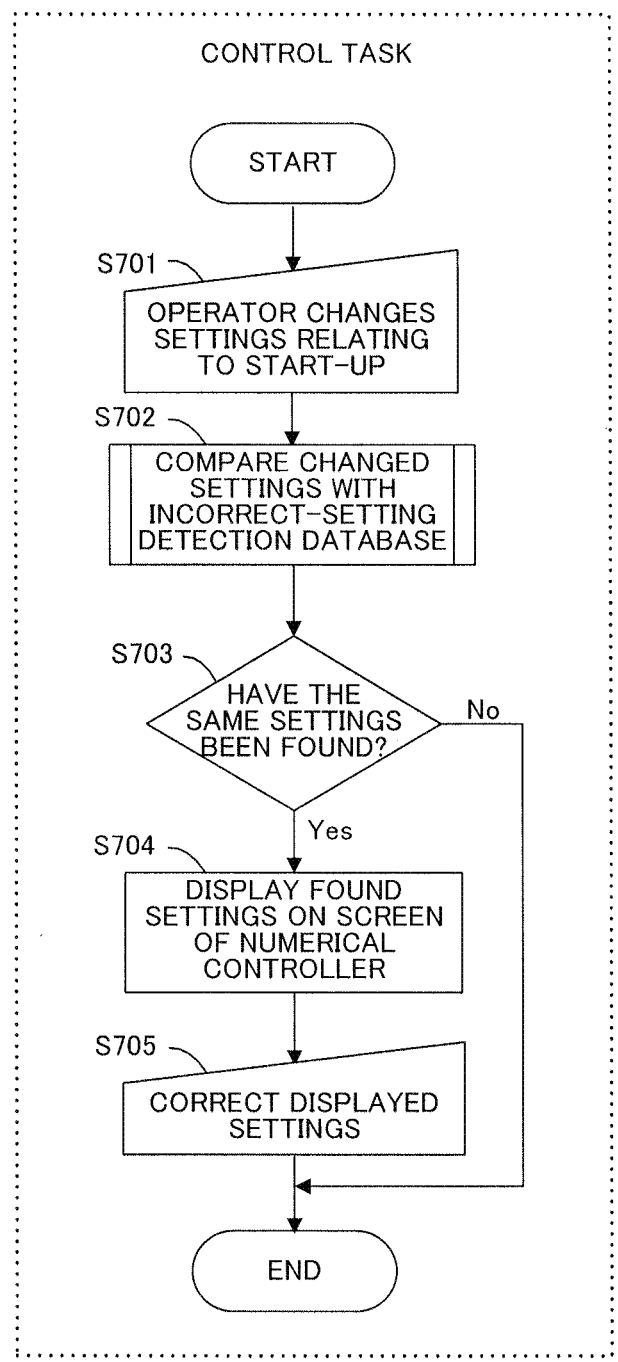
FIG. 7 is a flowchart for explaining a process for starting the numerical controller of FIG. 1.

Hereinafter, the process for starting the numerical controller 100 explained with reference to FIG. 6 will be described in detail using a flowchart of FIG. 7.

[Step S701] The control task receives an operation for changing settings relating to start-up stored in the non-volatile memory 150 from an operator through a control panel (not shown) or the like included in the numerical controller 100.

[Step S702] The control task searches the incorrect-setting detection database 220 based on the settings changed by the operator by a processing procedure described later.

[Step S703] If the same settings as the settings changed by the operator are found in step S702 (Yes), the flow proceeds to step S704. If the same settings are not found (No), the setting change process by the control task is ended.

[Step S704] The control task displays the settings found in the incorrect-setting detection database 220 on the display unit 300 connected to the numerical controller 100.

[Step S705] The control task receives setting changes from an operator for the settings displayed in step S704.

The numerical controller 100 of the present embodiment detects the same incorrect settings as before by the operation described above when settings relating to start-up are changed. Thus, a start-up failure of the numerical controller 100 is prevented.

Figure 8:
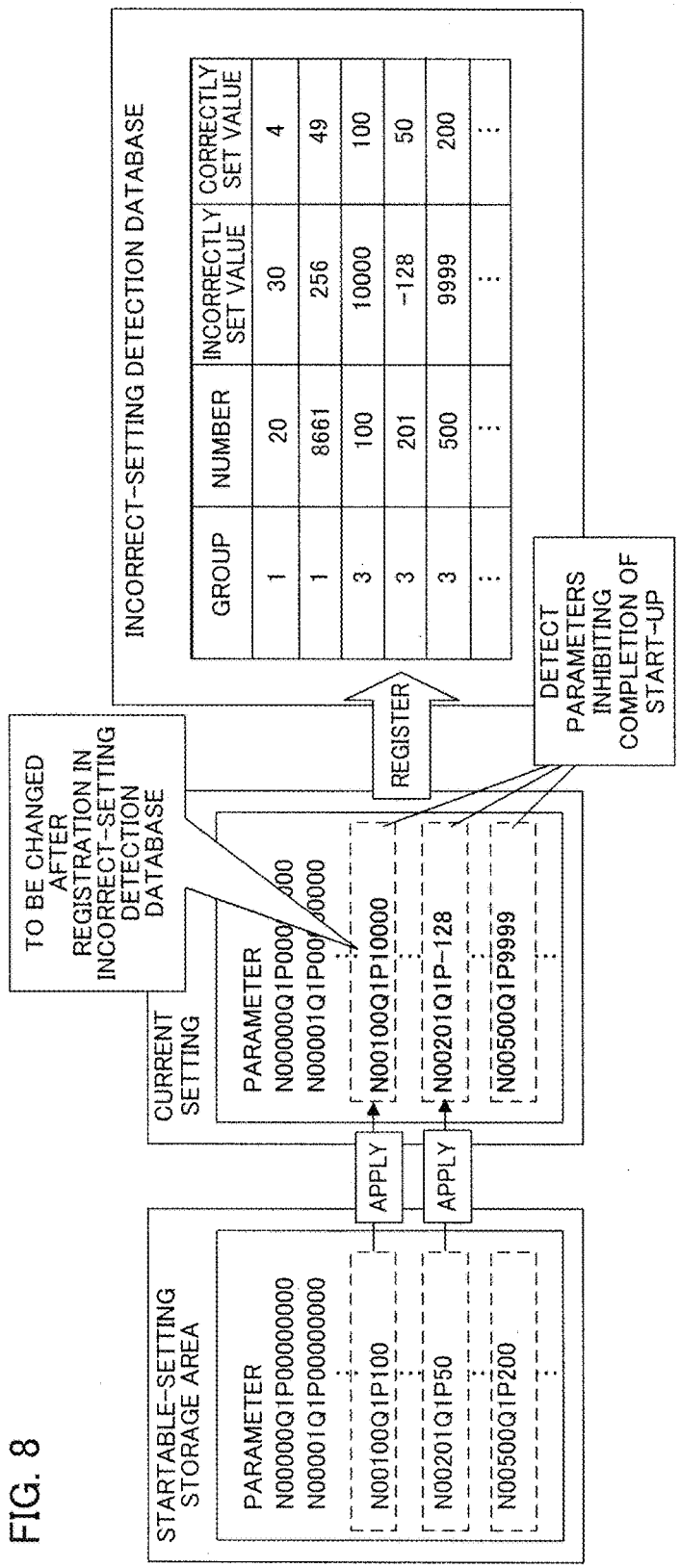
FIG. 8 is a diagram for explaining the outline of a process for registering incorrectly-set parameters in an incorrect-setting detection database by the numerical controller of FIG. 1.

FIG. 8 is a diagram for explaining the outline of a process for registering an incorrectly-set parameter in the incorrect-setting detection database 220 by the numerical controller 100.

In the case where a start-up of the numerical controller 100 has failed, a group of parameters presumed to be incorrectly set are identified among the current settings first. Then, each parameter of the group of parameters presumed to be incorrectly set is sequentially set in the incorrect-setting detection database 220 and changed to the setting value acquired from the startable setting data, stored in the startable-setting storage area 210 of the storage unit 200, and a determination is made by internal processing as to whether the numerical controller 100 can be started or not. If it is determined that the numerical controller 100 cannot be started, the same processing is repeated for the next incorrectly-set parameter.

Figure 9:
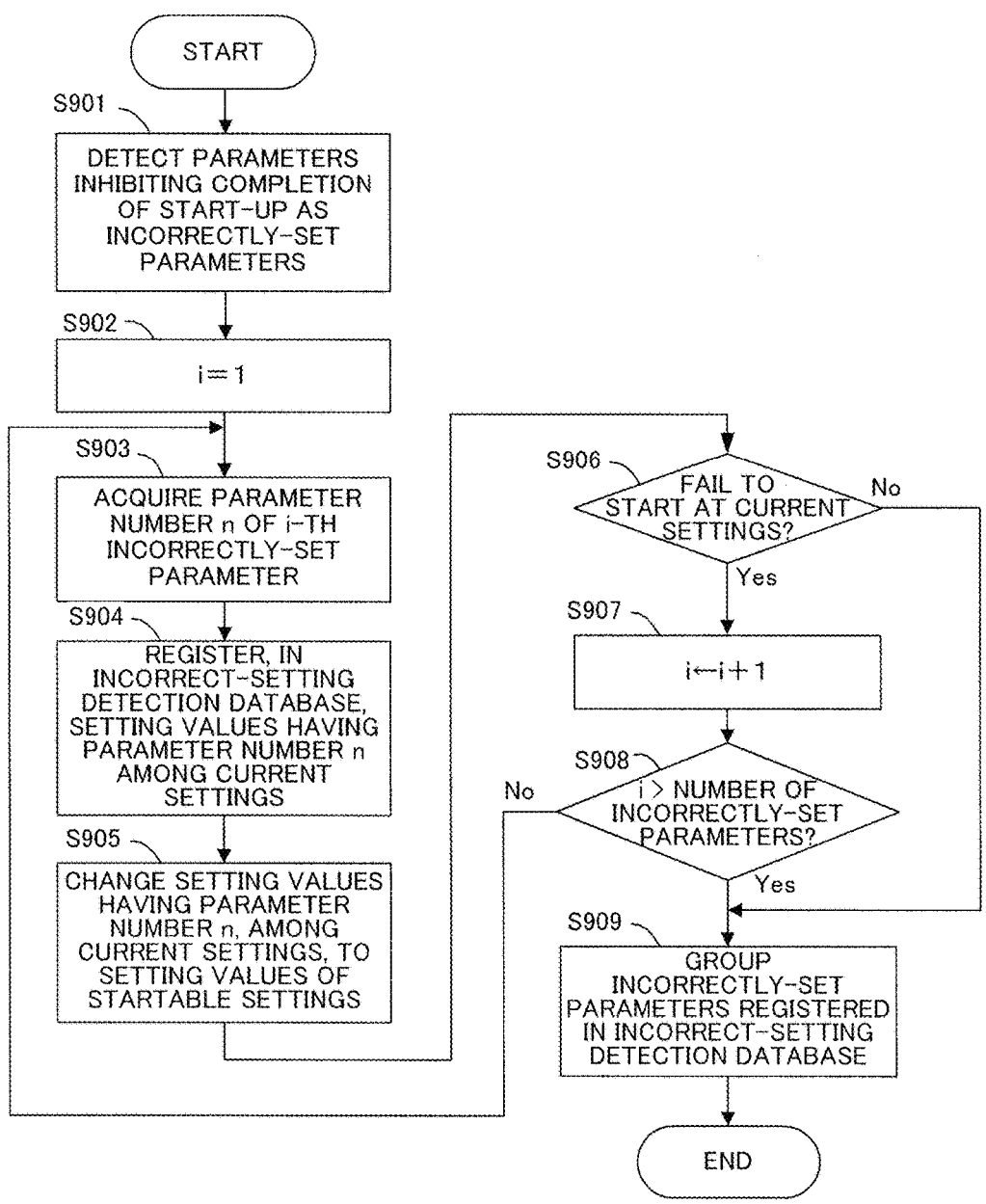
FIG. 9 is a flowchart for explaining a process for registration in an incorrect-setting detection database shown in FIG. 8 in detail.

Hereinafter, the process for registration in the incorrect-setting detection database 220 explained with reference to FIG. 8 will be described in detail using a flowchart of FIG. 9.

[Step S901] A group of parameters inhibiting the completion of a start-up in a state in which a start-up process of the control task is in progress are detected. With regard to a technique for detecting a group of parameters inhibiting the completion of a start-up, for example, parameters changed from startable setting data stored in the startable-setting storage area 210 of the storage unit 200 among the current settings may be detected as a group of parameters inhibiting the completion of a start-up, or parameters inhibiting the completion of a start-up may be detected based on an error outputted by the system of the numerical controller 100.

[Step S902] For each parameter of the group of parameters that have caused the start-up failure, detected in step S901, an index i is set as a variable which is used to repeatedly execute a process from step S903 to step S906. An initial value of i is 1.

[Step S903] The parameter number n of the i-th parameter of the group of parameters that have caused the start-up failure is acquired.

[Step S904] Among the current settings relating to start-up set in the non-volatile memory 150, the setting value having the parameter number n is registered in the incorrect-setting detection database 220.

[Step S905] Among the current settings relating to start-up set in the non-volatile memory 150, the setting value having the parameter number n is changed to a value acquired from the startable setting data that has been stored in the startable-setting storage area 210 of the storage unit 200.

[Step S906] Based on the current settings relating to start-up changed in step S905 by the internal processing of the controller, a determination is made as to whether the numerical controller 100 can be started or not. The process for determining whether the numerical controller 100 can be started or not may be performed by a technique in which the incorrect-setting detection database 220 is searched, or the like. Then, if it is determined that the numerical controller 100 can be started (No), the flow proceeds to step S909. If it is determined that the numerical controller 100 cannot be started (Yes), the flow proceeds to step S907.

[Step S907] The value of the index i is incremented by one.

[Step S908] If the value of the index i exceeds the number of incorrectly-set parameters detected in step S901 (Yes), the flow escapes from the repeated processing and proceeds to step S909 because it is indicated that all the incorrectly-set parameters detected have been registered in the incorrect-setting detection database 220; otherwise (No), the flow returns to step S903.

[Step S909] The parameters registered in the incorrect-setting detection database 220 by the current processing are given a group number and grouped. As a group number, a different numeric value is given every time a process for registration in the incorrect-setting detection database 220 is executed. In the case where a plurality of incorrectly-set parameters are registered in one registration process by repeating the process from step S903 to step S908, the plurality of incorrectly-set parameters are given the same group number.

Figure 10:
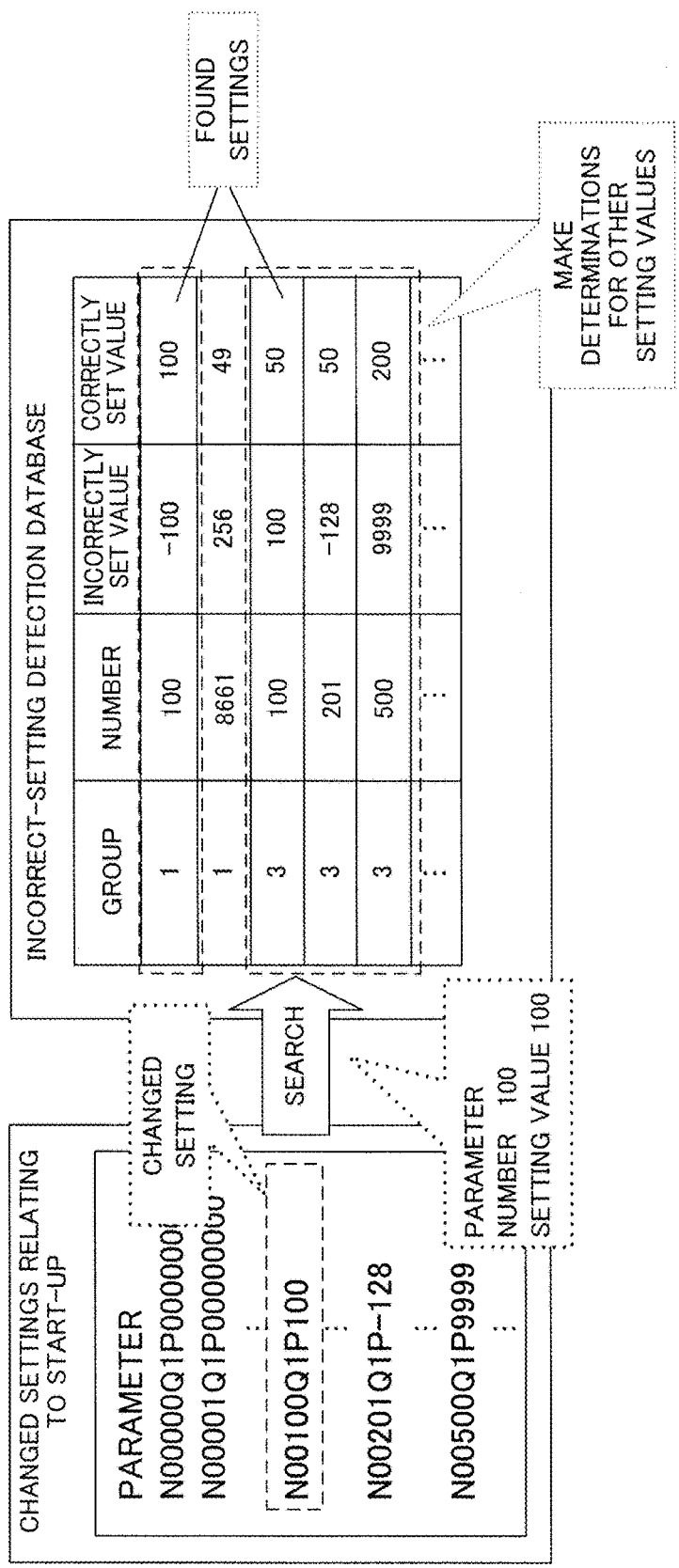
FIG. 10 is a diagram for explaining the outline of a process for comparing settings relating to start-up changed by an operator with an incorrect-setting detection database by the numerical controller of FIG. 1.

FIG. 10 is a diagram for explaining the outline of a process for comparing settings relating to start-up changed by an operator with an incorrect-setting detection database by the numerical controller 100 of the present embodiment.

When an operator operates a control panel (not shown) or the like of the numerical controller 100 to change a setting relating to the start-up of the numerical controller 100, a determination is made as to whether the same parameter number as a parameter for which a setting has been changed is registered in the incorrect-setting detection database 220 or not, by searching the incorrect-setting detection database 220 by parameter number.

Then, if the same parameter number is registered, a determination is made as to whether the setting value of the changed parameter is equal to an incorrectly-set value registered in the incorrect-setting detection database 220 or not. In the case where there are a plurality of parameter numbers registered, such a determination is made for each of the parameter numbers.

Moreover, if the setting value of the changed parameter is equal to an incorrectly-set value registered in the incorrect-setting detection database 220, a determination is also made for each of other parameters for which the same group number as the found parameter is set, as to whether the setting value of the parameter is equal to an incorrectly-set value or not. Then, if a group in which all setting values are equal is registered in the incorrect-setting detection database 220, it is determined that the current settings are incorrect settings.

Hereinafter, the process for comparing settings relating to start-up changed by an operator with the incorrect-setting detection database explained with reference to FIG. 10 will be described in detail using a flowchart of FIG. 11.

[Step S1101] The control task acquires the parameter number n of a setting changed by an operator.

[Step S1102] The control task searches the incorrect-setting detection database 220 based on the parameter number n acquired in step S1101.

[Step S1103] The control task sets an incorrect setting flag to a logical value "false".

[Step S1104] The control task executes repeated processing from step S1105 to step S1107 for each parameter found in the incorrect-setting detection database 220.

[Step S1105] The control task compares a setting value of the parameter having the parameter number n with an incorrectly-set value of the parameter found in the incorrect-setting detection database 220, and determines as to whether the two values are equal or not. If the two values are equal (Yes), the flow proceeds to step S1106. If the two values are not equal (No), the repeated processing is continued for the next one of the found parameters.

[Step S1106] For other parameters of the same group as the parameter found in the incorrect-setting detection database 220, the control task determines as to whether incorrectly-set values of the other parameters are equal to the current setting values of the parameters or not. If all the incorrectly-set values of the other parameters are equal to the current setting values of the parameters (Yes), the flow proceeds to step S1107. If at least one of the incorrectly-set values of the parameters is not equal to the current setting value of the parameter (No), the repeated processing is continued for the next one of the found parameters.

[Step S1107] The control task determines that the current settings are incorrect settings, and sets the incorrect setting flag to a logical value "true".

Figure 11:
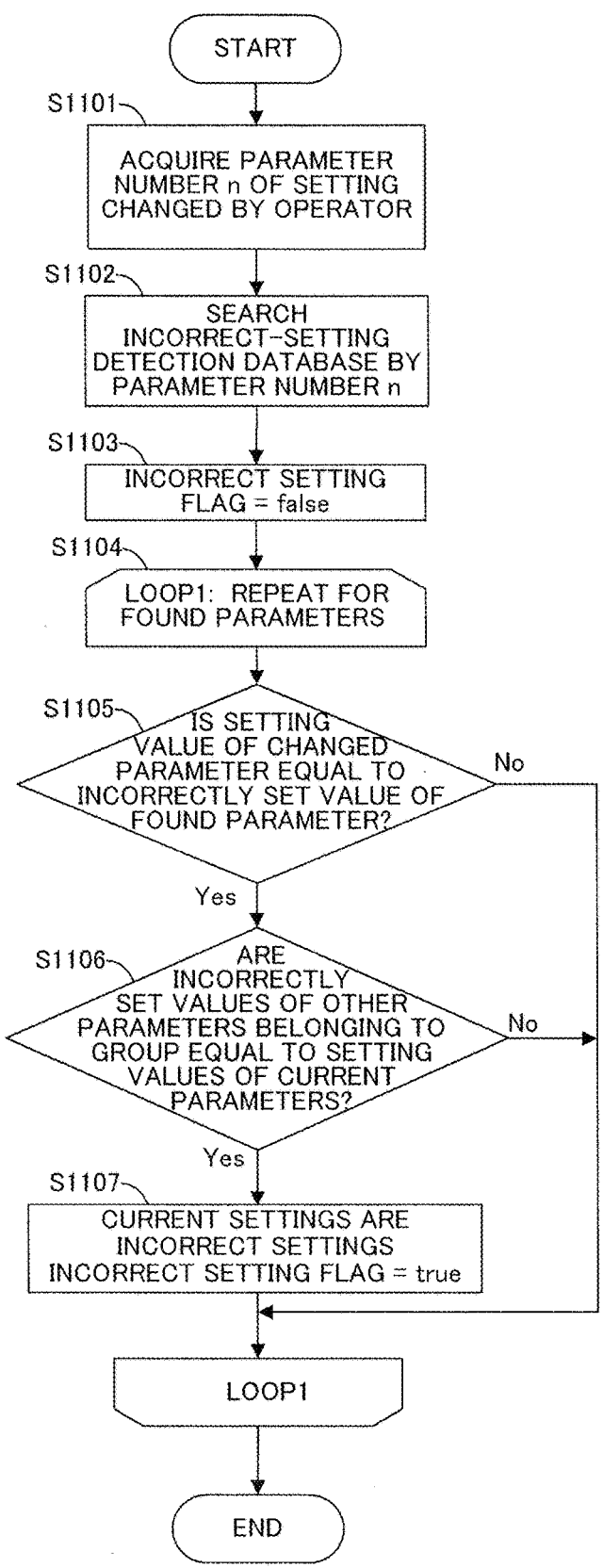
FIG. 11 is a flowchart for explaining in detail the process for comparing settings relating to start-up changed by an operator with the incorrect-setting detection database shown in FIG. 10.

After the processing explained with reference to FIG. 11 is executed, whether the current settings are incorrect settings or not can be detected by referring to the incorrect setting flag. In the case where the incorrect setting flag is set to a logical value "true", it can be determined that the current settings are incorrect settings.

In the numerical controller 100 of FIG. 1, the control task and the start-up determination task run on the single CPU 110. However, a configuration may be employed in which the control task and the start-up determination task run on independent CPUs, respectively.

Figure 12:
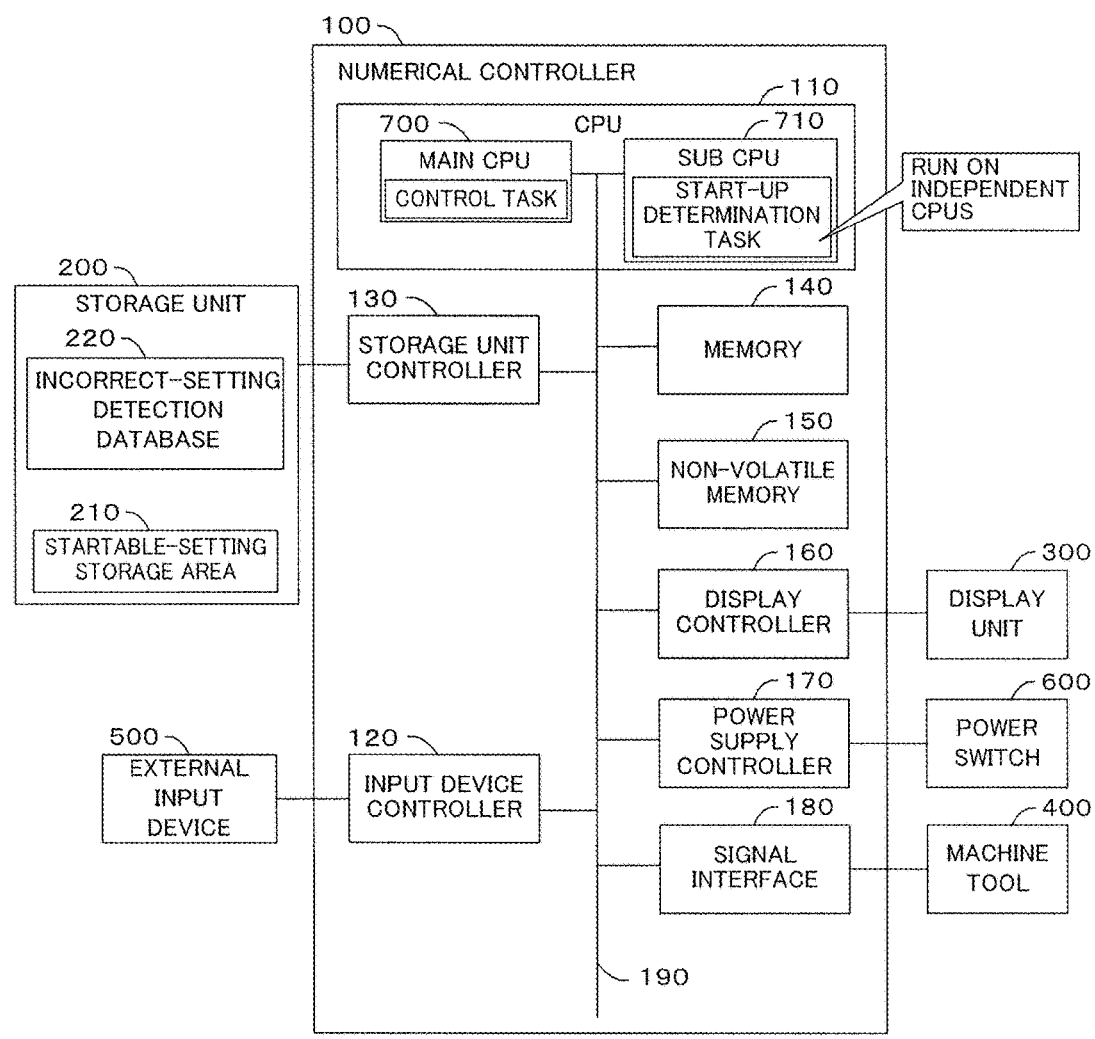
FIG. 12 is a block diagram showing a principal part of a second embodiment of a numerical controller according to the present invention.

Accordingly, a second embodiment of a numerical controller according to the present invention will be described with reference to FIG. 12. This numerical controller 100 includes multiprocessors, and is configured such that the control task runs on a main CPU 700 and that the start-up determination task runs on a sub CPU 710.

In the present embodiment, since the numerical controller 100 is configured as described above, the start-up determination task can be executed on the sub CPU 710 even in the case where the main CPU 700 itself is in a hung-up state. Accordingly, maintainability in an emergency is enhanced.

Figure 13:
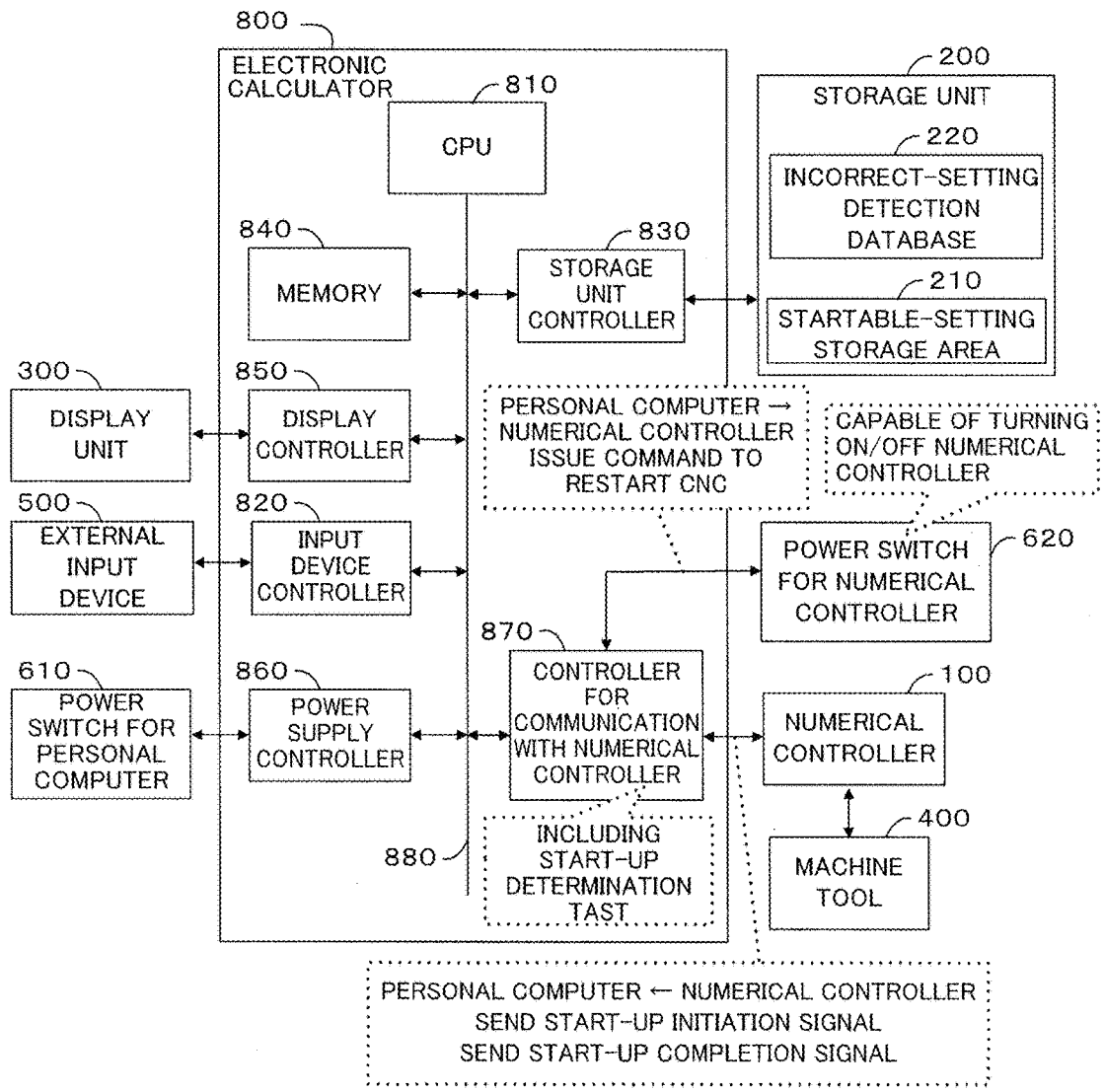
FIG. 13 is a block diagram showing a principal part of a third embodiment of a numerical controller according to the present invention.
Figure 14:
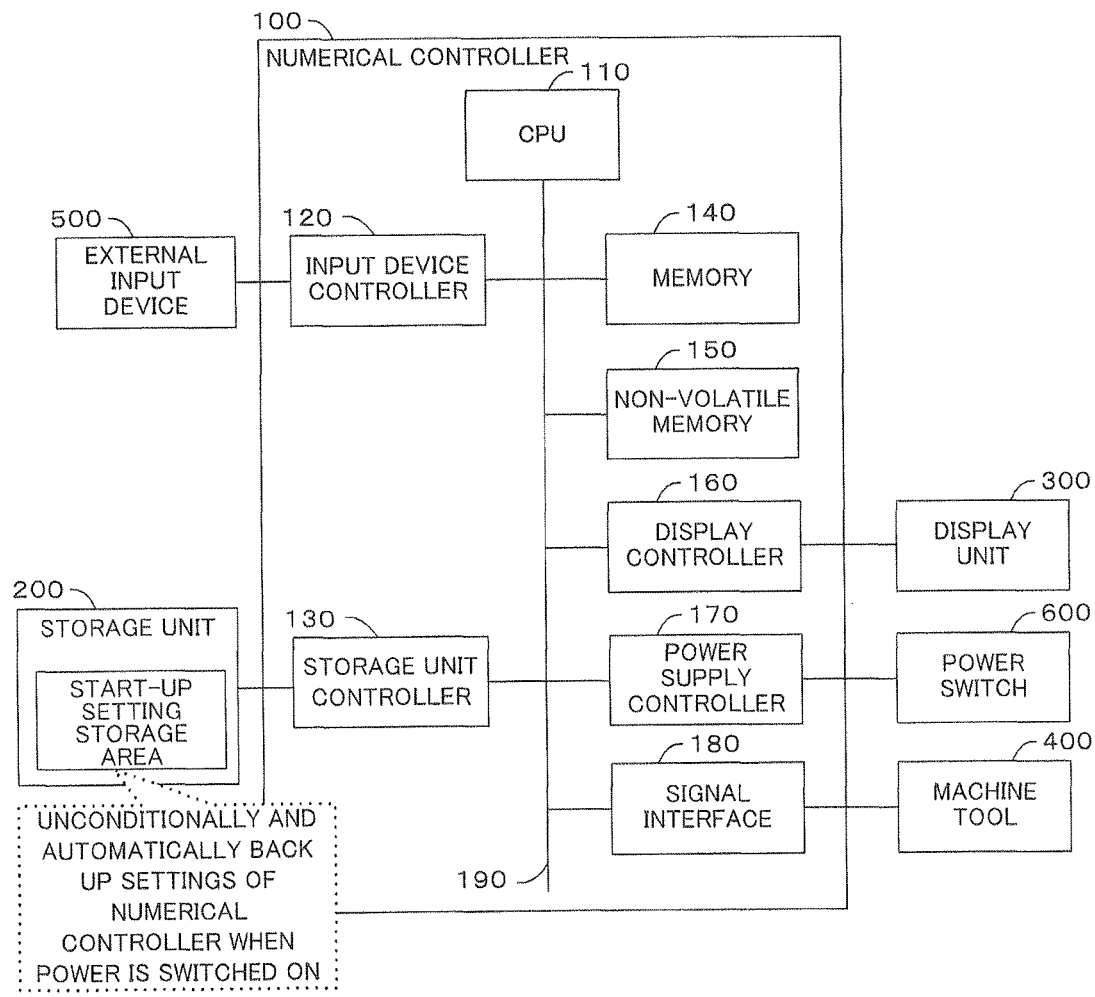
FIG. 14 is a block diagram showing a principal part of a numerical controller in a prior-art technique.

Further, a third embodiment of a numerical controller according to the present invention will be described with reference to FIG. 13.

This numerical controller 100 includes an electronic calculator 800. The electronic calculator 800 includes a CPU 810 as a processor which performs arithmetic processing, and an input device controller 820 for controlling an external input device 500, a storage unit controller 830 for controlling a storage unit 200, a memory 840 such as a RAM or a ROM, a display controller 850 for controlling a display unit 300, a power supply controller 860 for controlling the turning on and off of the electronic calculator 800 based on an ON/OFF signal from a power switch 610, and a controller 870 for communication with the numerical controller 100 which controls the sending or receiving of data to or from a numerical controller 100, which are connected to the CPU 810 through a bus 880.

The start-up determination task runs on the communication controller 870, and a configuration is employed in which the numerical controller 100 can be restarted by controlling a switch 620 for the numerical controller 100. Moreover, the start-up determination task receives a start-up initiation signal and a start-up completion signal of the numerical controller 100 from the control task running on the numerical controller 100.

The above-described configuration enables the start-up determination task to be executed on the electronic calculator 800 even in the case where the numerical controller 100 is in a hung-up state. Accordingly, maintainability in an emergency is enhanced.

The invention claimed is:

1. A numerical controller comprising:
   a storage unit controller for controlling a storage unit to
      store a setting value of a start-up setting that inhibits completion of a start-up of the numerical controller, and
      store a start-up setting which allows the numerical controller to be started; and
   a first processor configured to perform a method, the method including:
      determining whether a start-up of the numerical controller has been completed at a time of start-up of the numerical controller;
      storing a current start-up setting in the storage unit as startable setting data if it is determined that the start-up of the numerical controller has been completed;
      detecting, if it is determined that the start-up of the numerical controller has not been completed, a start-up setting that inhibits completion of a start-up and registering the detected start-up setting in the storage unit;
      reconstructing a current setting of the numerical controller to a startable setting based on the startable setting data stored in the storage unit;
      restarting the numerical controller; and
      when the start-up setting of the numerical controller has been changed, searching the storage unit based on the changed start-up setting, and, if the same start-up setting as the changed start-up setting is found, outputting the found start-up setting.

2. The numerical controller according to claim 1, further comprising a second processor configured to control a start-up of the numerical controller.

3. The numerical controller according to claim 2, wherein the first processor determines that a start-up has been completed if one machining cycle has been completed within a certain length of time.

4. The numerical controller according to claim 2, wherein the first processor determines that a start-up has been completed if a specific signal has been inputted within a certain length of time.

5. The numerical controller according to claim 2, wherein the first processor determines that a start-up has been completed if a command has been received from an application incorporated in the numerical controller within a certain length of time.

6. The numerical controller according to claim 2, wherein the first processor determines that a start-up has been completed if a servo motor becomes ready within a certain length of time.

7. The numerical controller according to claim 2, wherein the first processor determines that a start-up has been completed if a spindle motor becomes ready within a certain length of time.

8. The numerical controller according to claim 2, wherein the first processor determines that a start-up has been completed if a network communication becomes ready within a certain length of time.

9. The numerical controller according to claim 1, wherein the first processor determines that a start-up has been completed if one machining cycle has been completed within a certain length of time.

10. The numerical controller according to claim 1, wherein the first processor determines that a start-up has been completed if a specific signal has been inputted within a certain length of time.

11. The numerical controller according to claim 1, wherein the first processor determines that a start-up has been completed if a command has been received from an application incorporated in the numerical controller within a certain length of time.

12. The numerical controller according to claim 1, wherein the first processor determines that a start-up has been completed if a servo motor becomes ready within a certain length of time.

13. The numerical controller according to claim 1, wherein the first processor determines that a start-up has been completed if a spindle motor becomes ready within a certain length of time.

14. The numerical controller according to claim 1, wherein the first processor determines that a start-up has been completed if a network communication becomes ready within a certain length of time.

* * * * *